Figure 1:
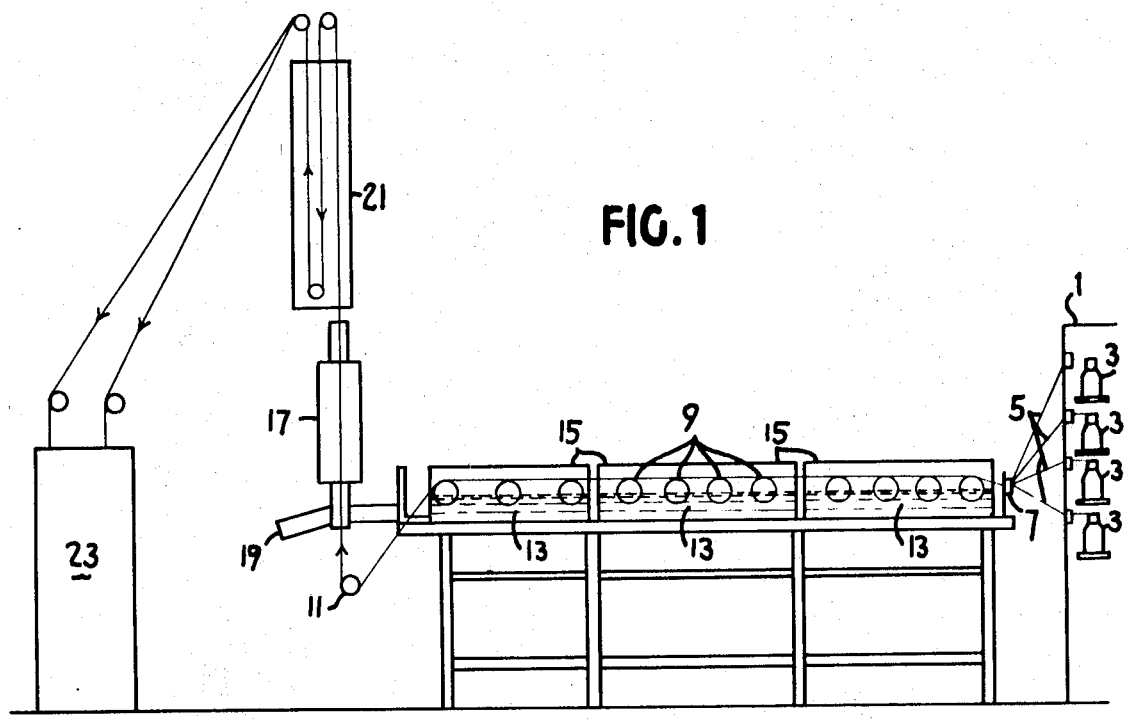

United States Patent

[11] 3,619,252

| [72] | Inventor | Alfred M. Roscher |
| | | Allison Park, Pa. |
| [21] | Appl. No. | 605,814 |
| [22] | Filed | Dec. 29, 1966 |
| [45] | Patented | Nov. 9, 1971 |
| [73] | Assignee | PPG Industries, Inc. |
| | | Pittsburgh, Pa. |

[54] MANUFACTURE OF ELASTOMER COATED GLASS FIBERS
23 Claims, 2 Drawing Figs.

[52] U.S. Cl. ................................................. 117/66,
117/76, 117/93.1, 117/126
[51] Int. Cl. ....................................................... C03c 25/02,
B44d 1/50, B32b 17/04
[50] Field of Search............................................. 117/126
GR, 76 T, 93.1, 66

[56] References Cited
UNITED STATES PATENTS
2,865,790 12/1958 Baer ............................. 117/93.1

| 3,367,793 | 2/1968 | Atwell .......................... | 117/126 X |
| 3,424,608 | 1/1969 | Marzocchi et al. ........... | 117/126 X |
| 3,437,122 | 4/1969 | Van Gils ....................... | 152/330 |
| 3,437,517 | 4/1969 | Eilerman et al. ............. | 117/126 |
| | | FOREIGN PATENTS | |
| 942,914 | 2/1949 | France ......................... | 117/93.1 |

Primary Examiner—William D. Martin
Assistant Examiner—D. Cohen
Attorney—Chisholm and Spencer ABSTRACT: This invention relates to coating and impregnating glass fibers with an aqueous elastomer composition and then drying the glass fibers with high frequency electrical heating to move substantially all the water while leaving the elastomer solids substantially unaffected. Also encompassed herein are products produced by the foregoing process, as well as the subsequent process step of applying additional heat to cure a heat curable resin component of the coating and impregnating composition.

PATENTED NOV 9 1971

3,619,252

INVENTOR
ALFRED M. ROSCHER

BY *Chisholm and Spencer*
ATTORNEYS

MANUFACTURE OF ELASTOMER COATED GLASS FIBERS

This invention relates to treated glass fibers and, more particularly, to glass fiber strand or yarn that has been coated with an elastomeric material for use as a reinforcement for elastomeric products, such as automotive tires, drive belts, conveyor belts, hosing and the like.

Specifically, the present invention provides an improved process for manufacturing elastomer coated glass fiber strand, yarn, cord or fabric, and to an improved product produced by said process.

The desirability of the use of glass fibers to reinforce natural and synthetic elastomeric materials, such as nitrile rubber, SBR and neoprene rubber, is generally well-known. The principal advantages provided by the use of glass fibers as a reinforcement for rubber include: excellent tensile strength, which is unaffected by moisture and temperature up to about 600° F.; excellent dimensional stability; definite elongation characteristics; outstanding resistance to cold flow or yield under stress; and good aging characteristics. However, even though the above represent significant property advantages over existing rubber reinforcements, such as cotton, rayon, nylon and polyester, difficulty has been encountered in converting the glass fibers into a suitable reinforcement system for natural and synthetic elastomeric materials.

An advance in promoting the acceptance of glass fibers as a reinforcement system for rubber and the like was made when it was proposed that glass fiber strand first be coated with a coupling agent and, either simultaneously therewith or during a subsequent treatment, coated with an elastomeric material that is compatible with the elastomer which the glass fiber strand is intended to reinforce. However, this treatment alone, while demonstrating that better utilization could be made of the properties of glass fibers as a reinforcement material, was still not sufficient to promote the general acceptance of glass fibers as an improved reinforcement material. Additional problems arose in connection with elastomer coated glass fibers and, more particularly, elastomer coated glass fiber strands,.

Among these additional problems were those of drying elastomer coated glass fibers or glass fiber strand while processing the glass fibers over conveyor rolls, pulleys and the like without stripping off coating material and/or without depositing coating material on the conveying and supporting elements; of producing elastomer coated glass fibrous material that was not tacky and was therefore susceptible of being readily handled and processed by winding, twisting, plying or weaving operations into strand, yarn, cord, cable, fabric or the like; and of producing elastomer coated glass fibrous products at a high rate of speed without the necessity of additional expenditures in processing steps, time and equipment to produce a desirable product.

Prior to the present invention, difficulties were encountered in drying coated glass fibers that were wet or saturated with elastomeric dip while processing the glass fibers through a heated atmosphere over supporting and conveying elements. Thus, as previously practiced, the elastomer coating was initially provided by coating and impregnating the glass fibers with a solution or liquid dip containing the elastomer and the wet or saturated glass fibers were then supported and conveyed under slight tension over rollers or the like as they traversed through a heated atmosphere to dry the elastomer coating on the glass fibers. If the elastomer coating was heated at too high a rate, bubbles developed in the coating. Furthermore, if the elastomer coating on the glass fibers was not sufficiently dry upon reaching the first supporting and conveying element within the heated atmosphere, the elastomer coating had a tendency to strip off of the glass fibers and deposit on the first and perhaps even subsequent supporting and conveying elements. This resulted in producing coated glass fibers having an insufficient amount of elastomeric coating material or, at best, producing a nonuniform coating on the glass fibers. In addition, there was presented a serious cleaning problem in terms of continuously having to remove any buildup of elastomeric material from the conveying and supporting elements. If the conveying and supporting elements were not kept clean, among other problems that resulted was the tendency to deposit on the glass fibers lumps or "flags" of elastomeric residue that had collected or had been allowed to build up on the conveying and supporting elements.

In addition, prior to this invention problems were encountered due to the production of elastomer coated glass fibers or glass fiber strand that had an undesirable tendency towards tackiness, which resulted in sticking or blocking of the glass fibrous material during subsequent winding, twisting, plying or weaving operations. These problems are disclosed in U.S. Pat. Nos. 3,029,589, 3,029,590 and 3,287,204, as well as published South African Patent Application No. 65/5536, filed Oct. 14, 1965. To avoid the above-mentioned problems, recourse was had in the prior art to applying various lubricating or "slip" coatings, referred to more specifically hereinafter, on the glass fibrous material prior to the aforesaid winding, twisting, plying or weaving operations.

Furthermore, in order to overcome or alleviate to some extent the aforementioned bubbling, stripping and residue problems, it was found necessary to substantially reduce production speed and/or to provide a significantly longer oven wherein a longer unsupported span of the coated glass fibrous material could be accommodated before it reached the first supporting or conveying element within the heated atmosphere. This was necessary to assure that the elastomer coating on the glass fibers was sufficiently dry before contacting any supporting and conveying element or the like where the elastomer coating could potentially strip off or become deposited. The tackiness problem, as aforesaid, could be alleviated to some extent by the additional operation of applying "slip" coatings. However, in addition to the undesirability of this extra coating operation, these "slip" coatings generally had to be removed by subsequent washing or scouring. Thus, the desirability of providing a process wherein there is avoided all of the aforementioned additional expenditures in processing steps, time and equipment should be readily apparent.

Briefly, the present invention provides a novel means and method to improve the uniformity, the handling and the subsequent processing characteristics of elastomer coated fiber glass and fiber glass strand. More specifically, the present invention teaches the advantageous use of high frequency electrical heating apparatus to improve both elastomer coated glass fiber products and the process by which they are manufactured.

Accordingly, it is an object of this invention to provide nontacky elastomer coated glass fiber strand, yarn or textile fabric for reinforcement of rubber.

It is a further object of this invention to provide an improved process for manufacturing rubber coated glass fiber products.

It is also an object of this invention to provide improved fiber glass reinforced elastomeric products.

Figure 2:
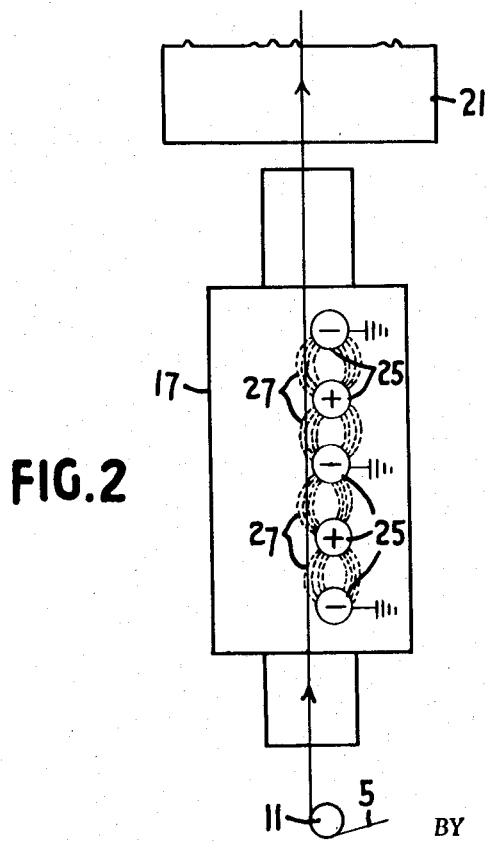

The above and other objects and advantages of this invention will become more apparent when considered in connection with the accompanying drawings, wherein:

FIG. 1 is a diagrammatic representation of a typical flow process that may be employed in the practice of the invention; and FIG. 2 is a diagrammatic representation of high frequency dielectric heating apparatus that may be employed in the practice of the invention.

Referring to the drawings in detail, FIG. 1 shows a creel 1 having mounted thereon a plurality of bobbins 3 containing glass fiber strand 5. Each of the glass fiber strands 5 is coated with a sizing material comprising a lubricant, binder and coupling agent, such as disclosed in U.S. Pat. application Ser. No. 535,683, filed March 21, 1966, now Pat. No. 3,437,517 and assigned to the assignee of the present invention. Other suitable size materials that contain suitable coupling agents may be found in U.S. patent applications Ser. No. 599,180, filed Dec. 5, 1966, now Pat. No. 3,459,585 for Novel Reaction Product and Use Thereof as a Glass Fiber Size, by Charles W. Killmeyer and George E. Eilerman, and Ser. No. 601,341, filed Dec. 13, 1966, and now abandoned for Glass Fibers for Elastomer Reinforcement, by Joe B. Lovelace and David H. Griffiths both assigned to the assignee of the present invention. Furthermore, as is conventional, each of the glass fiber strands 5 has imparted therein a 0.5 turn per inch twist to provide strand integrity and resistance to fuzzing during initial handling or processing prior to being coated and impregnated with elastomeric material.

The strands 5 are combined in parallel relation and passed through a ceramic guide 7, in tangential contact across motor driven rotating rollers or dip applicators 9, to a motor driven rotating wiper roller or pulley 11. The rollers or dip applicators 9 are partially suspended in an aqueous rubber dip or emulsion 13 contained within vessels or tanks 15. The dip applicators 9 are driven counter to the direction of travel of the strand 5 to improve the coating and impregnation thereof. The pickup of rubber dip 13 by the applicators 9 and strand 5 is more than sufficient to coat and impregnate the strands with the desired final amount of rubber dip or adhesive material 13. The wiper roller or pulley 11 is driven counter to the direction of travel of the strand 5 and serves to further impregnate the strand while removing excess rubber dip or adhesive material 13.

From the wiper roller or pulley 11, the coated, impregnated strands are passed vertically through a dielectric heater or drying oven 17, wherein certain undesirable volatile constituents of the rubber dip 13 are driven off and removed from the dielectric oven 17 by means of a blower 19. A suction device (not shown) could be used in lieu of or in addition to the blower 19 and would preferably be located adjacent the upper or exit end of vertically arranged dielectric oven 17. The construction of a typical dielectric heating or drying oven, suitable for use with the present invention, is shown more fully in FIG. 2.

Referring to FIG. 2, there is shown a diagrammatic representation of dielectric heater 17 comprising a vertically arranged series of spaced electrodes 25 electrically connected to a suitable power source (not shown) to produce an alternating, high frequency electrical field 27 between successive oppositely charged electrodes. Since the detailed construction and principle of operation of dielectric heaters does not, per se, form a part of the present invention, reference is made to U.S. Pat. Nos. 2,503,779 and 2,865,790 for these details. For a complete understanding of the present invention, it will be sufficient to point out that as strands 5, coated and impregnated with aqueous rubber dip 13, traverse across but not contacting the electrodes 25 and through fields 27, the liquid component of the dip, which has a higher dielectric constant that the solid component, is electrically activated to produce a uniform heating action throughout dip material 13. For the purpose of the present invention, the rate and amount of electrical activation or dielectric heating is controlled to the extent of removing or volatilizing substantially all of the liquid component of the aqueous dip material while leaving the solid component substantially unaffected. The coated and impregnated strands 5, as they leave dielectric heater 17, are free of bubbles and sufficiently dry and free of tack for the purpose of further processing the strand over rolls, pulleys or the like without fear of stripping off coating material and/or depositing coating material on supporting and conveying elements or the like.

Thereafter, the coated strands pass upwardly and then traverse through a hot gas oven 21 or other suitable heating device to cure or react the solid component of the adhesive 13, as will be explained more fully hereinafter. Following attainment of the desired degree of cure, the adhesive coated fiber glass strands are removed from the curing oven 21 and either collected on a suitable takeup device 23 or passed on for further processing.

After curing, the coated glass fiber strands are susceptible of being readily handled and, more particularly, of being processed by winding, twisting, plying or weaving operations into strand, yarn, cord, cable, fabric or the like without sticking or blocking of the coated glass fibrous material and without the necessity of applying thereto an additional "slip" coating.

EXAMPLE

A rubber adhesive was prepared from the following ingredients:

| Ingredients | Parts by Weight |
| --- | --- |
| Resorcinol | 352 |
| $CH_2O$ (37%) aqueous solution | 518 |
| NaOH | 9.6 |
| Butadiene-Styrene-Vinyl Pyridine Termpolymer Latex (Gen-Tac 41% solids dispersed in $H_2O$) | 7800 |
| $NH_4OH$ (28% $NH_3$ in $H_2O$) | 362 |
| $H_2O$ | 9572 |

These ingredients were mixed in the following manner. The Gen-Tac terpolymer latex was mixed with 1940 parts by weight of water. Water (7632 parts by weight) was added to a separate container. NaOH was then added and dissolved in the water in the separate container. Resorcinol was next added to the aqueous solution of NaOH and dissolved therein. Formaldehyde was added after the resorcinol and the mixture was stirred for 5 minutes and allowed to age at room temperature for 2 to 6 hours. The aging permits a small amount of condensation of resorcinol and formaldehyde and provides superior "H" test adhesion of the subsequently coated yarn to the rubber stock. The "H-Adhesion" test is a standard rubber industry test designated as ASTM-D-2138-62T issued in 1964. After aging, this mixture was added to the Gen-Tac latex and the resultant mixture was stirred slowly for 15 minutes. Ammonium hydroxide was then added and the mixture was stirred slowly for 10 minutes. The ammonium hydroxide inhibits further condensation of the resorcinol formaldehyde.

Sized glass fiber strands produced as described in U.S. Pat. application Ser. No. 535,683, supra, were coated and impregnated with the above adhesive, as described more fully hereinbelow.

Five strands (ECG-75's) with one-half turn per inch of twist were combined in parallel relation and passed under slight tension over rotating rollers 9 which were partially suspended in the adhesive 13. The pickup of adhesive dip was approximately 50–125 percent by weight of dip based on the weight of strands and was sufficient to provide a final coating on the strands of about 10 to 25 percent by weight of adhesive solids based upon the weight of strands. Above 7 percent by weight of adhesive solids based on the weight of strands, and preferably above 12 percent by weight of adhesive solids based on the weight of strands, is normally required to produce the desired tensile strength for strand used in reinforcing mechanical rubber goods. Fifteen percent by weight of adhesive solids based on the weight of strands has been found to be suitable for most purposes.

A pickup of adhesive dip sufficient to provide a final coating on the strands of above 7 percent by weight of adhesive solids based on the weight of strands produces a tacky product when dried by conventional hot gas or radiant heating means. A dried, tacky strand cannot thereafter be readily processed over rolls or the like without stripping off coating material and/or depositing coating material on the rolls or other handling equipment.

The coated strands 5 were passed vertically through a 36-inch high dielectric drying oven 17 to remove the water and $NH_3$ from the adhesive. Dielectric heater or drying oven 17 was operated at 4000–5000 volts between electrodes and a frequency of 27–30 megacycles. Unlike drying with conventional hot gas or radiant heating means, the strands, on leaving the dielectric heater, were free of bubbles and sufficiently dry and free of tack for further processing over rolls or the like without stripping off coating material and/or depositing coating material on the rolls.

The coated strands were next passed upwardly through a hot gas oven 21 maintained at a temperature of about 300° to 500° F. to effect curing of the resorcinol formaldehyde. The curing or condensing of the resorcinol formaldehyde is free to proceed with the removal of the $NH_3$. The condensation is time-temperature dependent. For example, heating the coated strands for 30 seconds at 370° F. or 20 seconds at 420° F. with the strands making several passes through oven 21 at a rate of speed of about 150–300 feet per minute is satisfactory. In any event, it has been found that for a given time-temperature relationship to effect curing of the resorcinol formaldehyde and for a given length of oven in which to accomplish the desired cure, the coated strands can be processed 5 to 6 times faster through the curing oven when exposed first to dielectric heating than was possible when dielectric heating and drying was not used. As aforesaid, the strands 5, on leaving the hot gas oven 21, were susceptible of being readily handled and processed by winding, twisting, plying or weaving operations without sticking or blocking of the coated glass fibrous material and without the necessity of applying an additional "slip" coating thereto.

The following rubber compound was reinforced with glass fibers that were sized, coated and processed as described above and the reinforcement was tested for "H" Adhesion in accordance with the aforementioned ASTM test D–2138–62T. The glass reinforcement used was cord of ECG–75 5/3 construction. The chemical identification of the ingredients in the rubber compound can be found in "Materials and Compounding Ingredients of Rubber and Plastics," published by Rubber World.

| Ingredients | SBR-Natural Rubber Blend |
|---|---|
| SBR 1500 | 75 |
| No. 1 RSS (Ribbed smoked sheet) | 25 |
| HAF Black | 50 |
| ZnO | 5 |
| Stearic Acid | 1 |
| Age-Rite Resin (anti-oxidant) | 1 |
| Sundex 790 (plasticizer) | 10 |
| Santocure (accelerator) | 1 |
| DOTG | 0.2 |
| Sulfur | 2.0 |

"H-Adhesion" Test at 230° F. for 30 Minutes
(Average 28 to 32 Pounds)

The advantages that accrue from the practice of the present invention are fully borne out by the aforementioned disclosure in U.S. Pat. Nos. 3,029,589, 3,029,590 and 3,287,204, as well as published South African Patent Application No. 65/5536, filed Oct. 14, 1965.

In U.S. Pat. Nos. 3,029,589 and 3,029,590, for example, there is disclosed an elastomer coating process wherein latex coated glass fiber strand is dried and cured in a conventional hot air oven maintained at a temperature such that the coating material does not boil or is not otherwise erratically disturbed during curing. As disclosed therein, the temperature for latex rubber material which will not generally effect a boiling of moisture therein and which thus will not cause bubbles in the coating due to such boiling, is in the order of 250° F. However, both of these patents also disclose that processing coated strand at a speed in the order of 100 feet per minute through a conventional oven having a length of 12 feet and maintained at a temperature in the order of 250° F. resulted in producing cured strand that was tacky. Thus, in an attempt to solve the bubble problem, a further problem of tackiness was encountered. No dielectric or high frequency electrical heating was disclosed as being employed in connection with either of the foregoing patents.

Furthermore, in one representative example disclosed in the aforesaid South African patent application, sized fiber glass strand was coated and impregnated with the following latex dip composition:

40–80 percent by weight of a natural rubber latex-resorcinol formaldehyde resin dispersed in aqueous medium to a solids of 38 percent by weight. (Lotol 5440—U.S. Rubber Company, Naugatuck Chemical Division) 60–20 percent by weight of water.

The strand impregnated with the above composition was advanced through a conventional drying oven maintained at a temperature within the range of 250° to 400° F. to remove the diluent from the impregnating composition and to advance the cure of the elastomeric materials in the coating to either an almost fully cured or a fully cured state. No dielectric or high frequency electrical heating was employed, and the elastomeric coating on the sized glass fiber surfaces was disclosed as being subject to tackiness or seizures when subsequently processed in winding, twisting, plying or weaving operations for use as a reinforcement in rubber tires, rubber belts, rubber coated fabrics or other glass fiber reinforced elastomeric products.

In addition, in U. S. Pat. No. 3,287,204, there is disclosed a similar process to that employed in the above patent and wherein the drying oven is maintained at an elevated temperature, such as at about 400° F., sufficient to remove the diluent from the applied elastomeric coating composition and to advance the cure or vulcanization of the elastomeric material in the coating to a stage less than the fully cured or vulcanized stage. No dielectric or high frequency electrical heating is disclosed as being used.

In each of the above prior art publications, reference is made, either directly or indirectly, to the production of elastomer coated fiber glass strands that have an undesirable tendency towards tackiness, which results in sticking or blocking of the strand during winding, twisting, plying or weaving operations. Furthermore, each of the above prior art disclosures finds it necessary to resort to the expedient of applying various powdered coatings, such as zinc stearate, corn starch, talc, polyethylene, silica, carbon black and the like, to alleviate the tackiness condition prior to subsequent handling and processing. In addition, in each case these various "slip" coatings are preferably removed by a washing operation or the like at some point prior to final use of the elastomer coated strand. The undesirability of these additional procedural steps should be apparent.

On the contrary, an elastomeric dip mixture of 50 percent by weight Lotol 5440 and 50 percent by weight water, such as disclosed in the aforesaid South African patent application, was processed in accordance with the present invention and there was produced an elastomer coated fiber glass strand that was free of bubbles and susceptible of being readily handled and processed by winding, twisting, plying or weaving operations into strand, yarn, cord, cable, fabric or the like without sticking or blocking of the coated glass fibrous material, thus avoiding the necessity of applying an additional "slip" coating thereto. Furthermore, in addition to being completely free of undesirable bubbles at the end of the dielectric heating operation, the coated and impregnated strand was sufficiently dry and free of tack for the purpose of being further processed over rolls, pulleys or the like in the curing oven without stripping off coating material and/or depositing coating material on supporting and conveying elements. Thus, by reason of the present invention, there can be avoided the additional expenditures in processing steps, time and equipment found necessary in the prior art to overcome the problems of seizures or tackiness.

As aforesaid, the two-step drying and curing process of the present invention and, more particularly, the dielectric heating step thereof, permitted processing the strands over rolls, pulleys and the like in the curing oven without stripping off coating material and/or depositing coating material on supporting and conveying elements. Also, the dielectric heating step provided improved uniformity of the coating on the strands. This was evidenced by a uniformity of amount and coloring of the coating on the strands, the absence of bubbles on the strands and the absence of "flags" or lumps of adhesives along the length of the coated strand, as is the case with conventional drying and curing techniques that do not employ dielectric heating.

In addition, the dielectric heating step permits faster production speeds for a given length of curing oven, the use of shorter curing ovens, and better process control than is the case with conventional drying and curing processes that do not utilize the dielectric heating step. Furthermore, as mentioned above, elastomer coated strand can be produced five to six times faster through the curing oven when exposed first to dielectric heating than was possible when dielectric heating and drying was not used.

The term "elastomer" as used herein and in the claims is intended to include elastic substances such as natural latex from the Hevea tree and synthetic rubber and rubberlike materials. It also includes natural and synthetic rubber and rubberlike materials which have been chemically modified such as by chlorination to improve their physical properties. Synthetic rubber includes rubberlike materials such as chloroprene, butadiene, isoprene and copolymers thereof with acrylonitrile, styrene and isobutylene. The term "elastomer" includes natural and synthetic rubber in the uncured or unvulcanized state as well as in the cured or vulcanized state.

While the term "glass fibers" is preferably employed to define continuous glass fibers as well as strands, yarns, cords and fabrics formed thereof, it is also within the contemplation of this invention to include within this term discontinuous, chopped or otherwise processed glass fibers, as well as strands, yarns, cords and fabrics formed thereof.

The term "high frequency electrical heating" as used herein is not intended to be limited solely to the disclosed use of what is commonly referred to as dielectric heating but rather is also intended to include all forms of high frequency electrical heating, including microwave heating, operating within the range of about 5 to about 3000 megacycles.

Although the present invention has been described with respect to specific details of certain embodiments thereof, it is not intended that such details act as limitations upon the scope of the invention except insofar as set forth in the accompanying claims.

1. A method of coating and impregnating glass fibers comprising
applying an aqueous adhesive composition to glass fibers, said adhesive composition containing heat curable resin, elastomer latex solids and volatile liquid components,
passing the adhesive-coated glass fibers through an electrical field induced by high frequency electrical heating means, said electrical field extending predominately parallel to the path of travel of said adhesive-coated glass fibers and being sufficient to electrically activate the liquid components of said adhesive composition
at a rate sufficient to volatilize and remove substantially all of said liquid components from said adhesive composition without substantially curing said heat curable resin until a glass fiber product is obtained with an elastomeric material on the surface thereof which is substantially uniformly free of said volatilizable liquid components and sufficiently dry and free of tack to permit the immediate processing of the coated glass fibers on handling equipment, and
curing the heat curable resin by the subsequent application of additional heat.

2. The method of claim 1 wherein volatilization of the liquid components is accomplished by dielectric heating within the range of about 5 to about 3000 megacycles.

3. The method of claim 1 wherein said glass fibers are coated and impregnated with sufficient adhesive composition to produce at least 5 percent by weight of elastomeric material on the surface thereof, based on the weight of the glass fibers.

4. The method of claim 1 wherein the adhesive composition is applied in one step and the glass fibers are coated and impregnated with sufficient adhesive composition to produce at least 12 percent by weight of elastomeric material on the surface thereof, based on the weight of the glass fibers.

5. The method of claim 1 wherein the adhesive composition is applied in one step and the glass fibers are coated and impregnated with sufficient adhesive composition to produce at least 15 percent by weight of elastomeric material on the surface thereof, based on the weight of the glass fibers.

6. The method of claim 1 wherein said adhesive composition contains a resin inhibitor.

7. The method of claim 1 wherein said adhesive composition contains ammonia.

8. The method of claim 1 wherein the fiber glass is sized with a material containing a coupling agent prior to coating.

9. The method of claim 8 wherein the elastomer latex is butadiene-styrene-vinyl pyridine terpolymer.

10. The method of claim 9 wherein the heat curable resin is resorcinol formaldehyde.

11. An elastomer coated glass fiber product produced according to the method of claim 1.

12. Elastomeric material reinforced with the product of claim 11.

13. A method according to claim 1, which further comprises the steps of processing the tack-free glass fibers by at least one of the processes of winding, twisting, plying and weaving to the form desired for use in combination with elastomeric material, and then combining the processed glass fibers with said elastomeric material.

14. The method of claim 13 wherein volatilization of the liquid components is accomplished by dielectric heating within the range of about 5 to about 3000 megacycles.

15. The method of claim 13 wherein the glass fibers are sized with a material containing a coupling agent prior to coating.

16. The method of claim 15 wherein the elastomer coating is butadiene-styrene-vinyl pyridine terpolymer.

17. The method of claim 16 wherein the heat curable resin is resorcinol formaldehyde.

18. The method of claim 17 wherein said glass fibers are coated and impregnated with sufficient adhesive composition to produce at least 5 percent by weight of elastomeric material on the surface thereof, based on the weight of the glass fibers.

19. The method of claim 1 wherein said adhesive-coated glass fibers are passed vertically through said electrical field.

20. The method of claim 19 wherein said glass fibers are coated and impregnated with sufficient adhesive composition to produce at least 25 percent by weight of elastomeric material on the surface thereof, based on the weight of the glass fibers.

21. A method of coating and impregnating glass fibers comprising
applying an aqueous adhesive composition to glass fibers, said adhesive composition containing heat curable resin, elastomer latex solids and volatile liquid components, and
passing the adhesive-coated glass fibers through an electrical field induced by high frequency electrical heating means, said electrical field extending predominately parallel to the path of travel of said adhesive-coated glass fibers and being sufficient to electrically activate the liquid components of said adhesive composition at a rate sufficient to volatilize and remove substantially all of said liquid components from said adhesive composition without substantially curing said heat curable resin until a glass fiber product is obtained with an elastomeric material on the surface thereof which is substantially uniformly free of said volatilizable liquid components and sufficiently dry and free of tack to permit the immediate processing of the coated glass fibers on handling equipment.

22. The method of claim 21 wherein said adhesive coated glass fibers are passed vertically through said electrical field.

23. The method of claim 22 wherein said glass fibers are coated and impregnated with sufficient adhesive composition to produce at least 25 percent by weight of elastomeric material on the surface thereof, based on the weight of the glass fibers.

* * * * *